United States Patent [19]

Masaki et al.

[11] 3,847,019

[45] Nov. 12, 1974

[54] ENGINE OUTPUT MEASURING DEVICE

[75] Inventors: Kenji Masaki; Shigeo Aono, both of Yokohama, Japan

[73] Assignee: Nissan Motor Company, Limited, Yokohama City, Japan

[22] Filed: May 25, 1973

[21] Appl. No.: 363,899

[30] Foreign Application Priority Data

May 26, 1972 Japan.............................. 47-52345

[52] U.S. Cl. .............................................. 73/117.3
[51] Int. Cl. .......................................... G01m 15/00
[58] Field of Search............................ 73/116, 117.3

[56] References Cited
UNITED STATES PATENTS 3,191,017   6/1965   Miura et al. ..................... 235/197 X Primary Examiner—Jerry W. Myracle

[57] ABSTRACT

An electronic device for electronically measuring the instantaneous variation of an engine output or engine torque in response to an electric functional signal representing the weight of intake air introduced into the engine. The electronic device comprises an electronic computing circuit which produces an electric functional signal representing a proportional constant dependent upon the weight of intake air and the engine output, and which multiplies the functional signal representing the proportional constant by the functional signal representing the weight of intake air to thereby produce an electric engine output signal proportional to the instantaneous variation of the engine output.

4 Claims, 9 Drawing Figures

ENGINE OUTPUT MEASURING DEVICE

The present invention is generally concerned with internal combustion engines and, more particularly, with an engine output measuring device which is capable of electronically measuring the instantaneous variation of an engine output or engine torque in accordance with a specific functional relationship between the weight of intake air drawn into the engine and the engine output or engine torque.

It has been previously proposed to electronically measure the variation of weight of intake air drawn into the engine under all continuously variable engine operating conditions. This is based on an observation that there is a specific functional relationship between the weight of intake air and the continuously variable conditions of engine speed, intake manifold vacuum and intake mixture temperature. A known electronic device for electronically measuring the weight of intake air comprises an electronic computing circuit including a pulse generator which is responsive to electric analog signals representing prevailing values of engine speed, intake manifold vacuum and intake mixture temperature to produce an electric output pulse signal which is synchronized with an electric engine speed pulse signal. The width and height of the output pulse signal from the pulse generator are further controlled in accordance with the electric analog signals mentioned above, so that the electronic computing circuit produces an electric functional signal proportional to the variation of the weight of intake air. It has been known that the electric functional signal proportional to the variation of the weight of intake air may be utilized as an important parameter for some electronic control devices, especially for use with motor vehicles.

In accordance with the present invention, it has been revealed that there is a specific functional relationship between the engine output or engine torque and the weight of intake air introduced into the engine. That is, the engine output or engine torque may be given by $$E_{out} = K \cdot Wa$$

where
$E_{out}$ = the engine output or engine torque, ps
$Wa$ = the weight of intake air, gr/sec
$K$ = proportional constant It will be easily understood from the above that the engine output $E_{out}$ may be obtained by multiplying the engine output constant K by the intake air weight $Wa$. As previously mentioned, since the intake air weight $Wa$ is readily measured by use of a prior art electronic measuring device, the engine output $E_{out}$ may be measured if only the engine output constant K is measured. The following Table (I) indicates the result of actual measurement of the value of the engine output constant K. It will be seen from the Table (I) that the value of the engine output constant K could be practically determined by the variation of the intake manifold vacuum and the engine speed. Thus, the present invention has been made on the basis of the principle mentioned above.

Table I

Value of Engine Output Constant K

| Intake manifold vacuum (-mmHg abs) | 720 | 660 | 560 | 460 | 360 |
|---|---|---|---|---|---|
| Engine speed (rpm) | | | | | |
| 1000 | 1.10 | 1.05 | 0.98 | 0.77 | 0.62 |
| 2000 | 1.20 | 1.15 | 1.07 | 0.83 | 0.68 |
| 3000 | 1.20 | 1.15 | 1.07 | 0.83 | 0.68 |
| 4000 | 1.20 | 1.15 | 1.07 | 0.83 | 0.68 |
| 5000 | 1.20 | 1.15 | 1.07 | 0.83 | 0.68 |
| 6000 | 1.15 | 1.10 | 1.02 | 0.80 | 0.65 |

It is, therefore, an object of the present invention to provide an engine output or engine torque measuring device which is capable of electronically measuring the instantaneous variation of the engine output by profitably employing a prior art electronic device for electronically measuring the weight of intake air to drawn into the engine.

Another object of the present invention is to provide an engine output measuring device which is simple in construction and economical to manufacture.

Still another object of the present invention is to provide an engine output measuring device which is highly reliable in operation and can easily be installed on existing engines.

These and other objects and advantages of the present invention will become apparent from the following detailed description taken in conjunction with the accompanying drawings in which.

Figure 1:
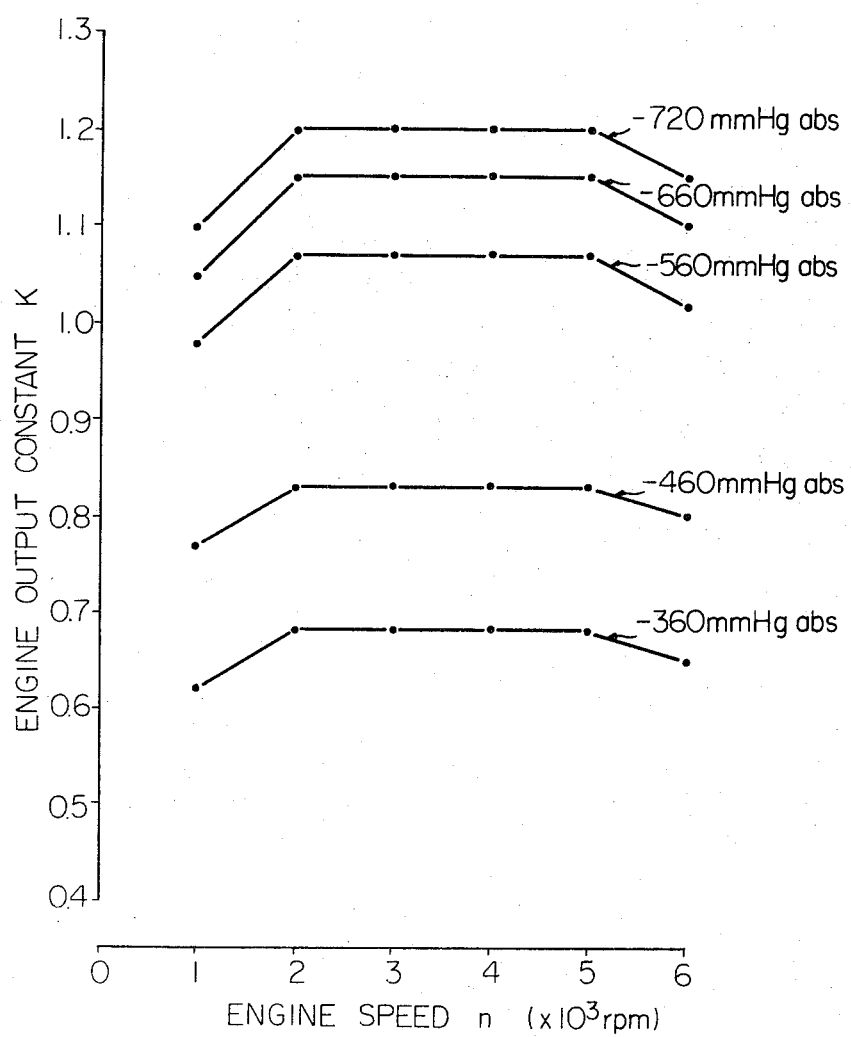
FIG. 1 is a graph showing values of engine output constants K which are determined by varying engine speed.
Figure 2:
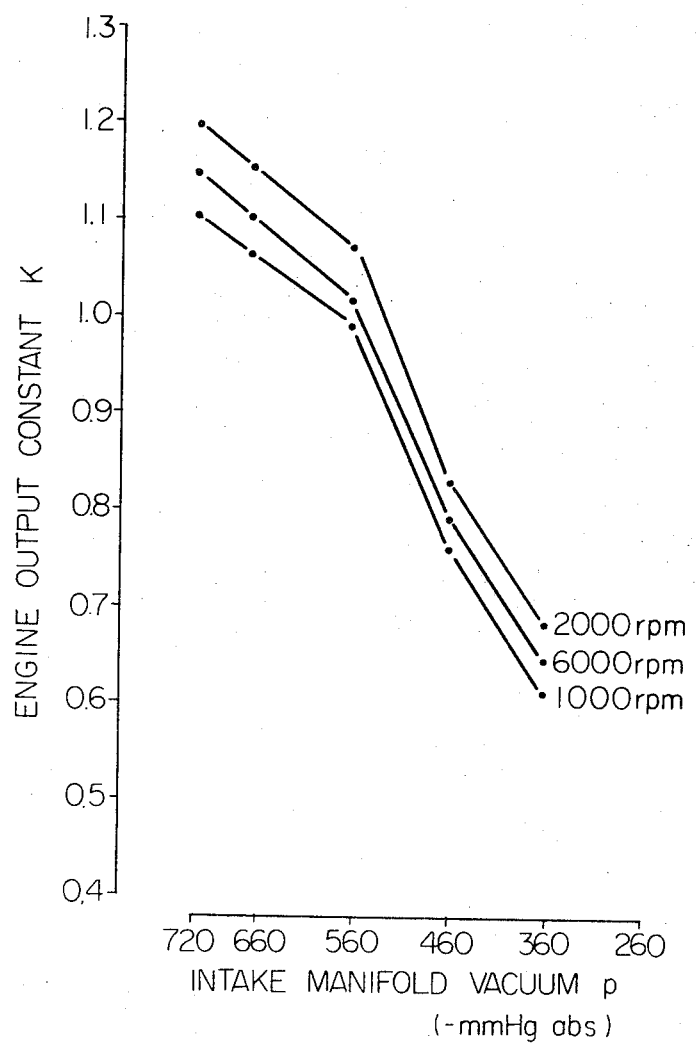
FIG. 2 is a graph showing value of an engine output constant K which is determined by the variation of an intake manifold vacuum.

As described hereinbefore, the value of the engine output constant K under variable engine operating conditions is determined by varying the engine speed and intake manifold vacuum. FIG. 1 illustrates the values of the engine output constants K which have been determined by varying engine speed only. It is to be appreciated that the value of the engine output constant K for each intake manifold vacuum varies similarly in accordance with the variation of the engine speed as shown in FIG. 1. On the other hand, FIG. 2 illustrates the value of the engine output constant K which is determined by the intake manifold vacuum only. It is also to be appreciated that the value of the engine output constant K for each engine speed varies similarly in accordance with the variation of the intake manifold vacuum as shown in FIG. 2.

Figure 3:
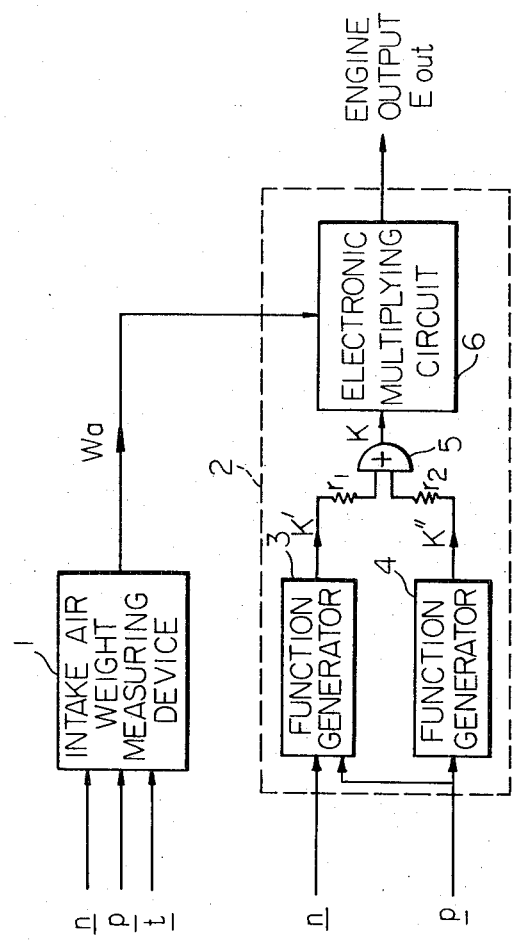
FIG. 3 shows a schematic block diagram of a preferred embodiment of an engine output measuring device in accordance with the present invention.

Referring now to FIG. 3, there is shown an engine output measuring device of the present invention in which a reference numeral 1 designates an electronic device for electronically measuring the weight of intake air to be drawn into the engine (not shown). The device 1 is responsive to electric signals representing prevailing values of engine speed $n$, intake manifold vacuum $p$ and intake mixture temperature $t$ to produce an electric functional signal $Wa$ representing the variation of the weight of intake air. As previously mentioned, a prior art electronic device for electronically measuring the weight of intake air may be utilized as the device 1 of the present invention. The electric functional signal $Wa$ from the device 1 is fed to a principal part of the present invention, that is, an electronic computing circuit 2 for calculating the engine output constant K. The electronic computing circuit 2 comprises two function generators 3 and 4, a summing means 5 and an electronic multiplying circuit 6.

When the function generator 3 receives an engine speed analog signal $n$ from an engine speed sensor (not shown), it produces an electric output signal representing one component K' of the engine output constant K. On the other hand, when the function generator 4 receives an intake manifold vacuum analog signal $p$ from an intake manifold vacuum sensor (not shown), it produces an electric output signal representing the other component K'' of the engine output constant K. The electric output signals representing the two components K' and K'' are fed through loads $r_1$ and $r_2$ respectively to the summing means 5 which then produces an electric functional signal representing the engine output constant K by summing the two components K' and K''. The electric functional signal representing the engine output constant K is then fed to an electronic multiplying circuit 6 which functions to multiple the electric functional signal of the engine output constant K by the electric functional signal $Wa$ from the intake air weight measuring device 1 to thereby produce an electric engine output signal $E_{out}$.

Figure 4:
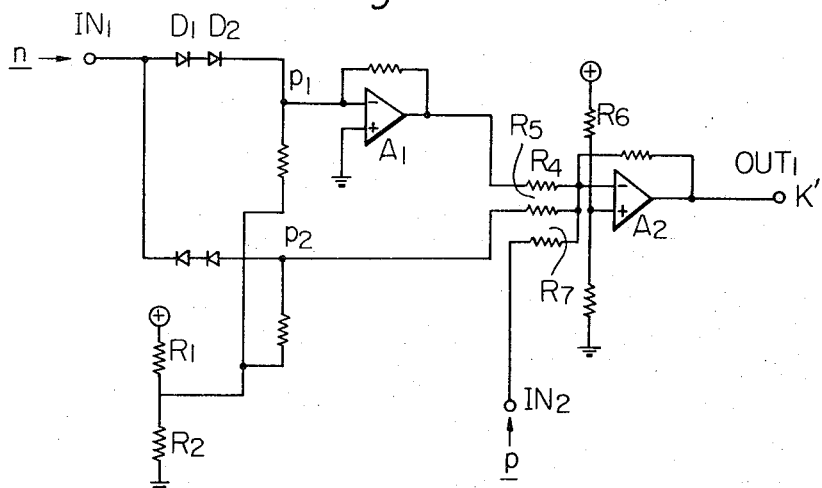
FIG. 4 shows a circuit diagram of a function generator shown in FIG. 3 which is responsive to an electric engine speed analog signal.
Figure 5:
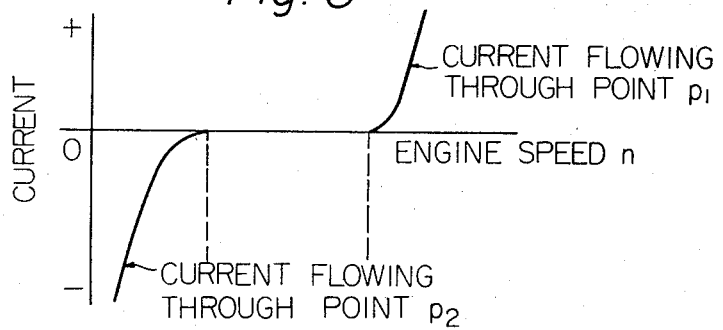
FIGS. 5 and 6 are explanatory graphs relating to the function generator shown diagrammatically in FIG. 4.
Figure 6:
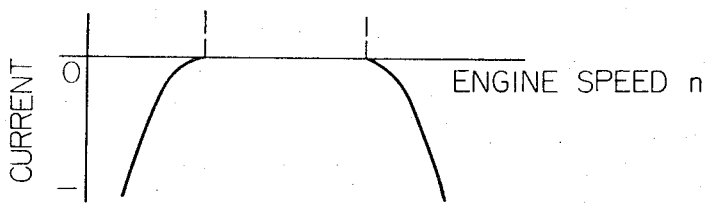

Reference is now made to FIGS. 4 to 6 which illustrate a circuit arrangement of the function generator 3 of the electronic computing circuit 2 shown in FIG. 3 and explanatory graphs as to its operation. In this circuit arrangement shown in FIG. 4, diodes $D_1$ and $D_2$ are positively biased at their cathodes, i.e., they are reversely biased at a given level determined by resistors $R_1$ and $R_2$ so as to prevent the diodes $D_1$ and $D_2$ from passing therethrough a forward current. As an engine speed increases, that is, when an electric engine speed analog signal $n$ having a level higher than the given level is applied to an input $IN_1$, a forward current flows through the diodes $D_1$ and $D_2$ so that a voltage appears at point $p_1$ (See FIG. 5). The voltage at point $p_1$ is applied to a negative input terminal of an amplifier $A_1$, the output voltage of which is applied through a resistor $R_4$ to a negative input terminal of an amplifier $A_2$, and then a voltage appearing at point $p_2$ is also applied through a resistor $R_5$ to the negative input terminal of the amplifier $A_2$. Further, an electric intake manifold vacuum analog signal $p$ is fed through an input $IN_2$ and a resistor $R_7$ to the negative input terminal of the amplifier $A_2$. On the other hand, a given positive voltage is applied through a resistor $R_6$ to a positive input terminal of the amplifier $A_2$ so that the amplifier $A_2$ produces an electric voltage signal representing the component K' of the engine output constant K through an output $OUT_1$. It should be appreciated that FIG. 6 indicates a curved line approximately similar to that shown in FIG. 1.

Figure 7:
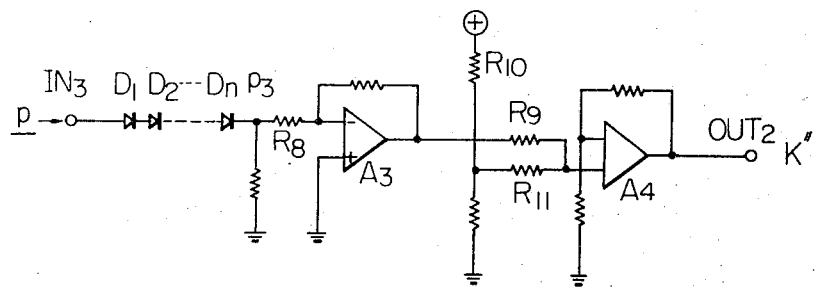
FIG. 7 shows a circuit diagram of another function generator of FIG. 3 which is responsive to an electric intake manifold vacuum analog signal.
Figure 8:
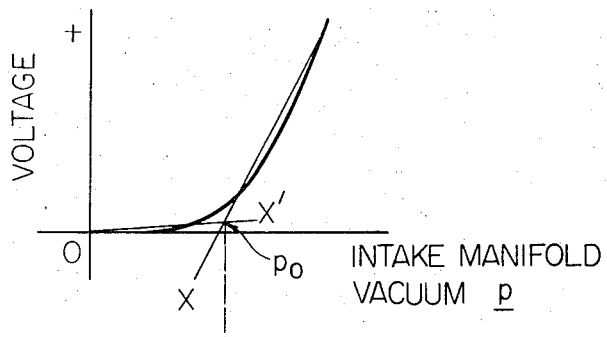
FIGS. 8 and 9 are explanatory graphs relating to the function generator of FIG. 7.
Figure 9:
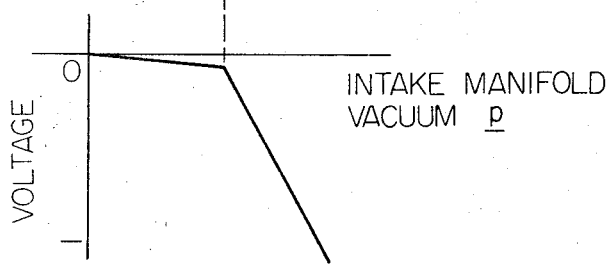

On the other hand, FIGS. 7 to 9 illustrate a circuit arrangement of the function generator 4 of the electronic computing circuit 2 shown in FIG. 3 and explanatory views as to its operation. In this circuit arrangement shown in FIG. 7, when the electric intake manifold vacuum analog signal $p$ is applied to an input $IN_3$, a plurality of diodes $D_1, D_2, D_3, \ldots, D_n$ serially connected with one another allow a forward current to flow therethrough so that a voltage appears at point $p_3$, as indicated by a curved line shown in FIG. 8. This voltage at point $p_3$ is closely approximated to a line which is composed of two straight lines X and X' shown in FIG. 8. The lines X and x' intersect at point $p_0$ with each other. The location of the intersecting point $P_0$ is defined by the number of the diodes. The voltage signal at point $p_3$ is applied through a resistor $R_8$ to a negative input terminal of an amplifier $A_3$ which functions to inverse its polarity (See FIG. 9). The output voltage of the amplifier $A_3$ is applied through a resistor $R_9$ to a positive input terminal of an amplifier $A_4$, and then a given positive voltage is also applied through resistors $R_{10}$ and $R_{11}$ to the positive input terminal of the amplifier $A_4$ which then produces an electric voltage signal representing the component K'' of the engine output constant K through an output $OUT_2$. It should be appreciated that FIG. 9 indicates a line approximately similar to that shown in FIG. 2. Thus, the electric voltage signal of the component K' is multiplied by the electric voltage signal of the component K'' by means of the summing means 5. The summing means 5 then produces an electric functional signal representing the engine output constant K which is further multiplied by the electric functional signal $Wa$ representing the weight of intake air by means of the electronic multiplying circuit 6 which then produces an electric engine output signal $E_{out}$.

The herein presented detailed descriptions of preferred embodiments of the present invention are for the purpose of explaining the principles thereof only, and are not to be considered as limiting or restricting the present invention, since many modifications may be made by exercise of skill in the art without departing from the scope of the present invention.

What is claimed is:

1. An electronic device for electronically measuring an output of an engine with an intake manifold having an engine speed sensor responsive to engine speed to produce an electrical engine speed analog signal representing prevailing value of engine speed, an intake manifold vacuum sensor responsive to intake manifold vacuum to produce an electrical intake manifold vacuum analog signal representing prevailing value of intake manifold vacuum, and an intake air weight measuring device for electronically measuring the weight of intake air drawn into the engine to produce an electrical functional signal representing the weight of intake air, comprising:

first electronic computing means responsive to said electrical analog signals from the engine speed sensor and the intake manifold vacuum sensor to produce an electrical functional signal representing a proportional constant dependent on the weight of intake air and the output of the engine; and second electronic computing means for multiplying said electrical functional signal from said first computing means by said electrical functional signal from the intake air weight measuring device to thereby produce an electrical output signal proportional to the variation of the engine output.

2. An electronic device as claimed in claim 1, in which said first electronic computing means comprises a first function generator responsive to the electrical engine speed analog signal from the engine speed sensor and an electrical intake manifold vacuum analog signal from the intake manifold vacuum sensor to produce a first electrical voltage signal representing one component of said proportional constant; a second function generator responsive to the electrical intake manifold vacuum analog signal from the intake manifold vacuum sensor to produce a second electrical voltage signal representing the other component of said proportional constant; and summing means for summing said first electrical component signal with said second electrical component signal to thereby compose said proportional constant.

3. An electronic device as claimed in claim 2, in which said first function generator comprises at least a diode reversely biased at a given level for allowing forward current to flow therethrough in response to the engine speed analog signal which has a level higher than said given level so that a voltage appears at the cathode of said diode; an amplifier responsive to said voltage appearing at the cathode of said diode to produce an electrical functional signal representing the higher engine speed region; summing means for summing said functional signal from said amplifier and the intake manifold vacuum analog signal to produce an electrical output signal; and another amplifier positively biased at a given level responsive to said electrical output signal from said summing means to produce said first electrical voltage signal representing one component of said proportional constant.

4. An electronic device as claimed in claim 2, in which said second function generator comprises at least a diode for allowing forward current to flow therethrough in response to the intake manifold vacuum analog signal so that a voltage appears at the cathode of said diode; a first amplifier responsive to said voltage appearing at the cathode of said diode to produce an electrical functional signal, said functional signal having an inverted polarity as opposed to that of said voltage at the cathode of said diode; summing means for summing said functional signal from said first amplifier and a given positive voltage signal to produce an electrical output signal; and a second amplifier responsive to said electrical output signal from said summing means to produce said second electrical voltage signal representing the other component of said proportional constant.

* * * * *